United States Patent [19]
Goto et al.

[11] Patent Number: 4,658,981
[45] Date of Patent: Apr. 21, 1987

[54] RECORDING TAPE CARTRIDGE

[75] Inventors: Shinichi Goto, Kyoto; Toshiyuki Amaike, Osaka, both of Japan

[73] Assignee: Hitachi Maxell, Ltd., Osaka, Japan

[21] Appl. No.: 789,090

[22] Filed: Oct. 18, 1985

Related U.S. Application Data

[63] Continuation of Ser. No. 610,648, May 16, 1984.

[51] Int. Cl.$^4$ .............................................. G03B 1/04
[52] U.S. Cl. ................... 220/338; 206/387; 242/198; 220/335
[58] Field of Search ............. 220/335, 334, 338, 91; 206/387; 242/198, 199

[56] References Cited

U.S. PATENT DOCUMENTS

| | | | |
|---|---|---|---|
| 3,086,676 | 4/1963 | Dilatush | 220/338 |
| 4,004,752 | 1/1977 | Kamaya | 242/198 |
| 4,071,939 | 2/1978 | Bock | 220/91 X |
| 4,422,599 | 12/1983 | Okamura et al. | 242/198 |
| 4,466,583 | 8/1984 | Giannis et al. | 242/198 |

FOREIGN PATENT DOCUMENTS 2051727  1/1981  United Kingdom ............... 220/91

Primary Examiner—Steven M. Pollard
Attorney, Agent, or Firm—Birch, Stewart, Kolasch & Birch

[57] ABSTRACT

In a recording tape cartridge having a lid member for opening and closing the front portion of the cartridge to protect a recording tape, there is provided at least one supporting recess for receiving a supporting shaft provided on the lid member, the supporting recess being provided with an opening to pass the supporting shaft when the lid member is mounted on the cartridge from the front and member is provided for preventing undesired disengagement of the supporting shaft from the supporting recess, so that the lid member can be mounted on the cartridge easily in an automatic production basis.

11 Claims, 17 Drawing Figures

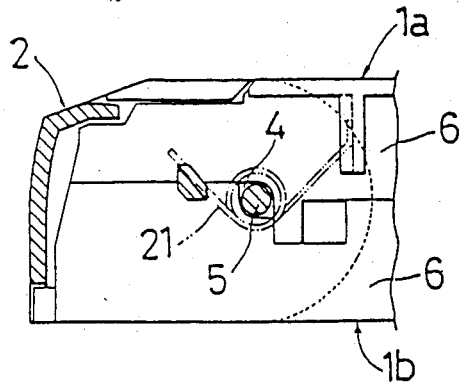
Fig. 1 (I)
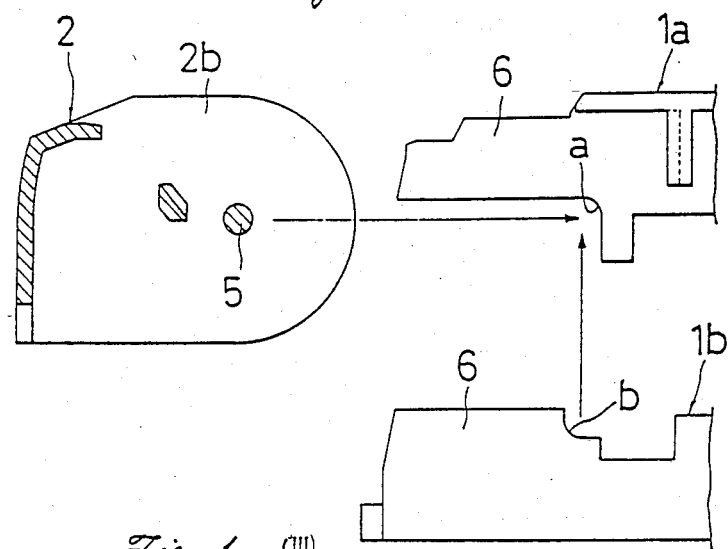
Fig. 1 (II)
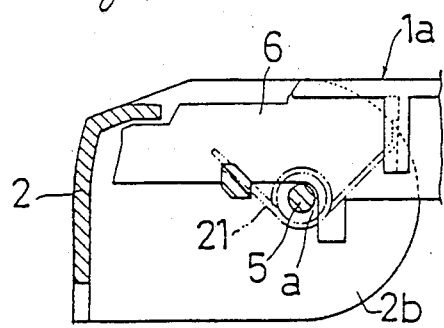
Fig. 1 (III)

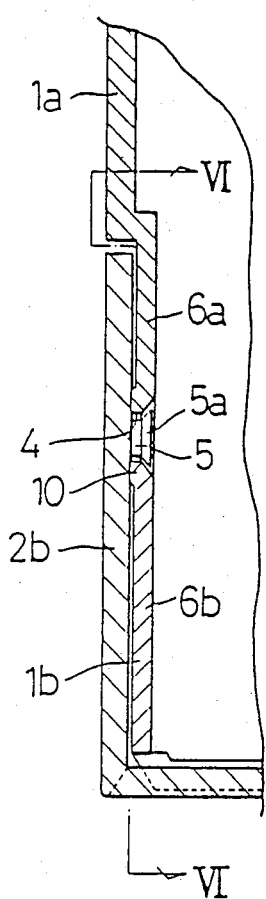
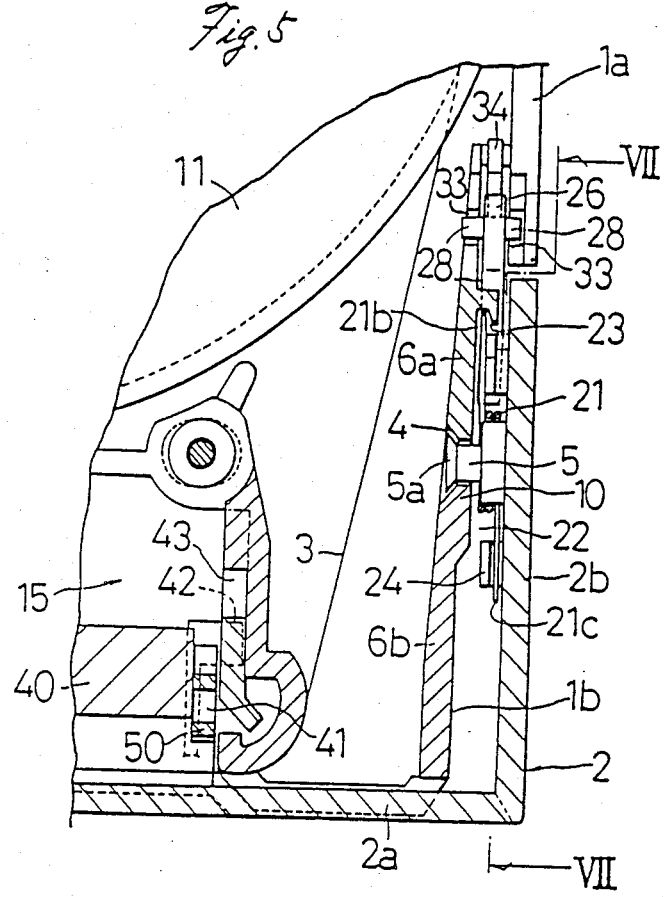
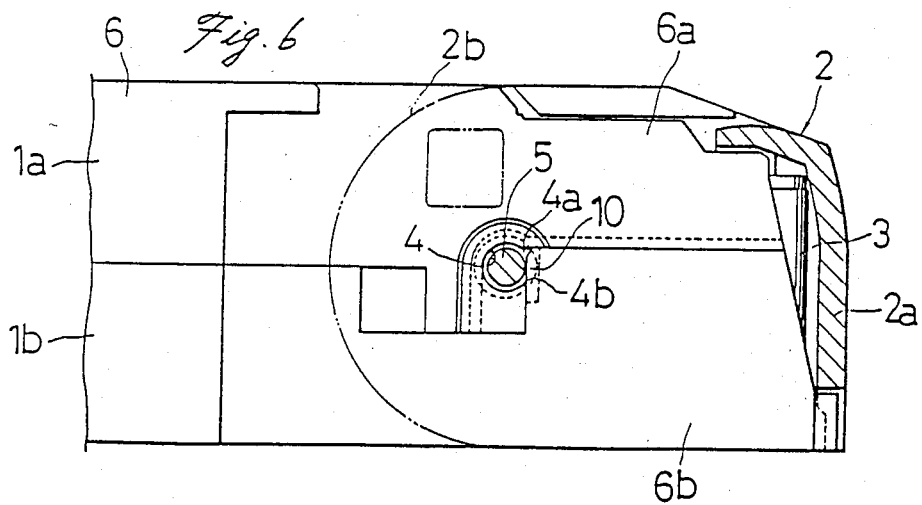

RECORDING TAPE CARTRIDGE

This application is a continuation of copending application Ser. No. 610,648, filed on May 16, 1984.

FIELD OF THE INVENTION

The present invention relates to a recording tape cartridge having a front lid member for protecting a recording tape.

BACKGROUND OF THE INVENTION

A recording tape cartridge as shown in FIGS. 2 and 3 which is so called a small size video tape cartridge is provided with a lid member 2 in the front portion of a case body 1 for opening and closing the front face of the case body to cover a recording tape 3.

In the conventional cartridge of the above type, the supporting mechanism of the lid member 2 is arranged in such a manner that there are formed a pair of supporting holes 4 on the front end portion of the left side wall and the right side wall 6 of the case body 1 and a pair of supporting shafts 5 is formed on the inside faces of side arms 2b of the lid member 2, whereby the lid member 2 is mounted on the front portion of the case body 1 by fitting the side arms 2b to the outside of the case body deforming the side arms 2b resiliently outwardly, then recovering the deformation of the side arms 2b, thus, the supporting shafts 5 are inserted in the corresponding supporting holes 4, so that the lid member 2 can be rotatably mounted on the front portion of the case body 1. The lid member 2 can be rotatably held on the case body 1 by defining the length of the supporting shafts 5 and the depth of the supporting holes 4 to be sufficiently large.

However, according to the conventional lid mounting as described above, in making the size of the cartridge smaller, there may occur a problem as mentioned hereinafter. In making the size of the tape cartridge small, the thickness of both side walls 6 of the case body 1 is necessarily decreased, thereby resulting in decreasing the depth of the supporting holes 4. On the other hand, if the length of the supporting shafts 5 is large, the supporting shafts 5 may be unduly projected inside of the case body 1 through the side walls 6, thus, the free end portion of the projection 5 abuts onto the recording tape which results in preventing smooth running of the recording tape. To avoid this, the supporting shafts must be short as the size of the cartridge is small. Under such arrangement, even if the lid member is once assembled correctly on the case body, the supporting shafts 5 would be easily disengaged from the supporting holes 4 by an impact or vibration applied to the case body 1. In order to avoid such disengagement of the supporting shafts from the holes, flanges 5a are provided on the free end portions of the supporting shafts, with the diameter of the flange 5a larger than the diameter of the supporting shafts. In this arrangement, however, since the supporting shafts 5 can not be inserted in the hole 4, a recess a is formed on the top section 1a and another recess b on the the bottom section 1b to form an opening similar to the hole 4 for insertion of the projection 5 when both sections 1a and 1b are assembled together as shown in FIGS. 1(I), (II) and (III). In this arrangement, the lid member 2 is assembled on the top section 1a by merely putting the supporting shafts 5 preliminarily on the recesses a without specific holding, therefore, the lid member 2 is easily disengaged from the top section 1a. Even if a spring 21 for exerting the lid member 2 toward the closed position is attached between the lid member and the top section, although the lid member 2 can be preliminarily held on the top section, there still remains a possibility of disengagement of the lid member 2 from the top section 1a. If the lid member is easily disengageable from the top section, there may occur a failure in assembling of the recording tape cartridge in the process of manufacturing of the cartridge, thereby preventing an automatic production of the recording tape cartridge.

SUMMARY OF THE INVENTION

An essential object of the present invention is to provide a recording tape cartridge which enables to assemble the lid member on the top section of the cartridge easily.

Other object of the present invention is to provide a recording tape cartridge which enables to mount the lid member on the case body in an automatic production basis by preventing or hindering disengagement of the lid member once preliminarily engaged on the case body.

According to the present invention, there is provided a recording tape cartridge comprising a case body formed by a top section and a bottom section, a lid member having a front lid plate and a pair of side arms projected from said lid plate, said lid member being movable between a closed position for closing the front portion of the case body and an opened position, said lid member being provided with a supporting shaft on an inner surface of at least one of the side arms, said case body being provided with supporting recess means defined in the side wall opposing to said supporting shaft for movably supporting said supporting shaft, said supporting recess means being provided with an opening for passing said supporting shaft when the lid member is mounted on the case body from the front and means for preventing easy disengagement of the supporting shaft from the supporting recess means.

BRIEF EXPLANATION OF THE DRAWINGS

FIG. 1 (I) through FIG. 1 (III) show a arrangement of a lid member in the conventional recording tape cartridge and FIG. 1 (I) is a cross sectional view showing the arrangement in which the lid member, top section and the bottom section are assembled, FIG. 1 (II) is an exploded view of the FIG. 1 (I), and FIG. 1 (III) is a cross sectional view of FIG. 1 (I) with the top section assembled.

FIG. 4 is a partial top plan view showing the left side part of the lid supporting mechanism used in the recording tape cartridge shown in FIG. 2, FIG. 5 is a partial top plan view showing the right side portion of the lid supporting mechanism used in the recording tape cartridge shown in FIG. 2, FIG. 6 is a cross sectional view taken along the line VI—VI in FIG. 4.

DETAILED DESCRIPTION OF THE PREFERRED EMBODIMENTS

Figure 2:
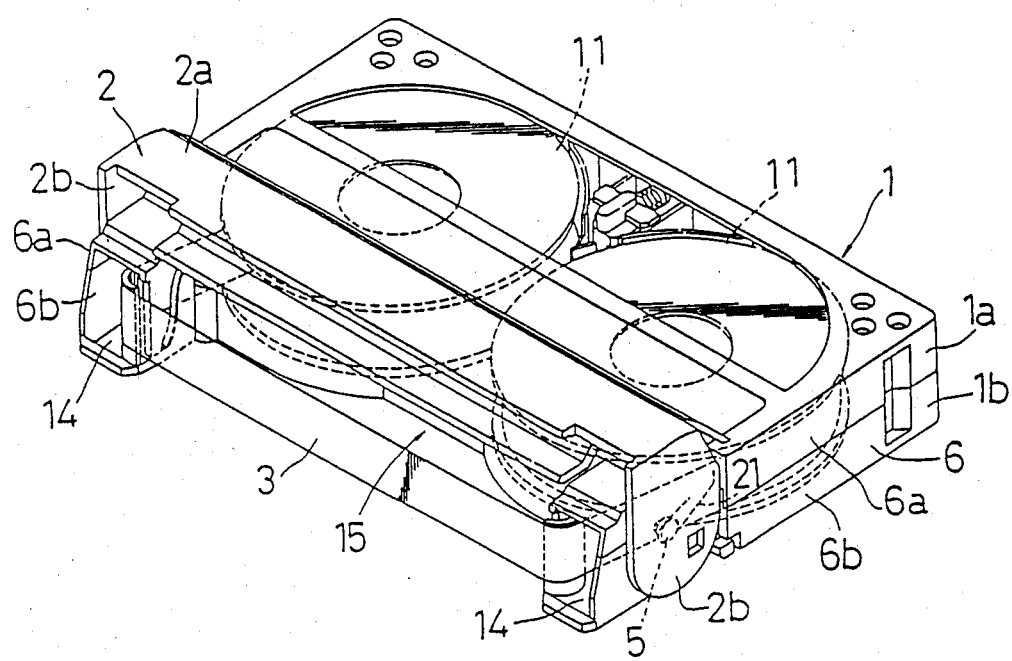
FIG. 2 is a perspective view of one preferred embodiment of the recording tape cartridge according to the present invention with the lid member opened.
Figure 3:
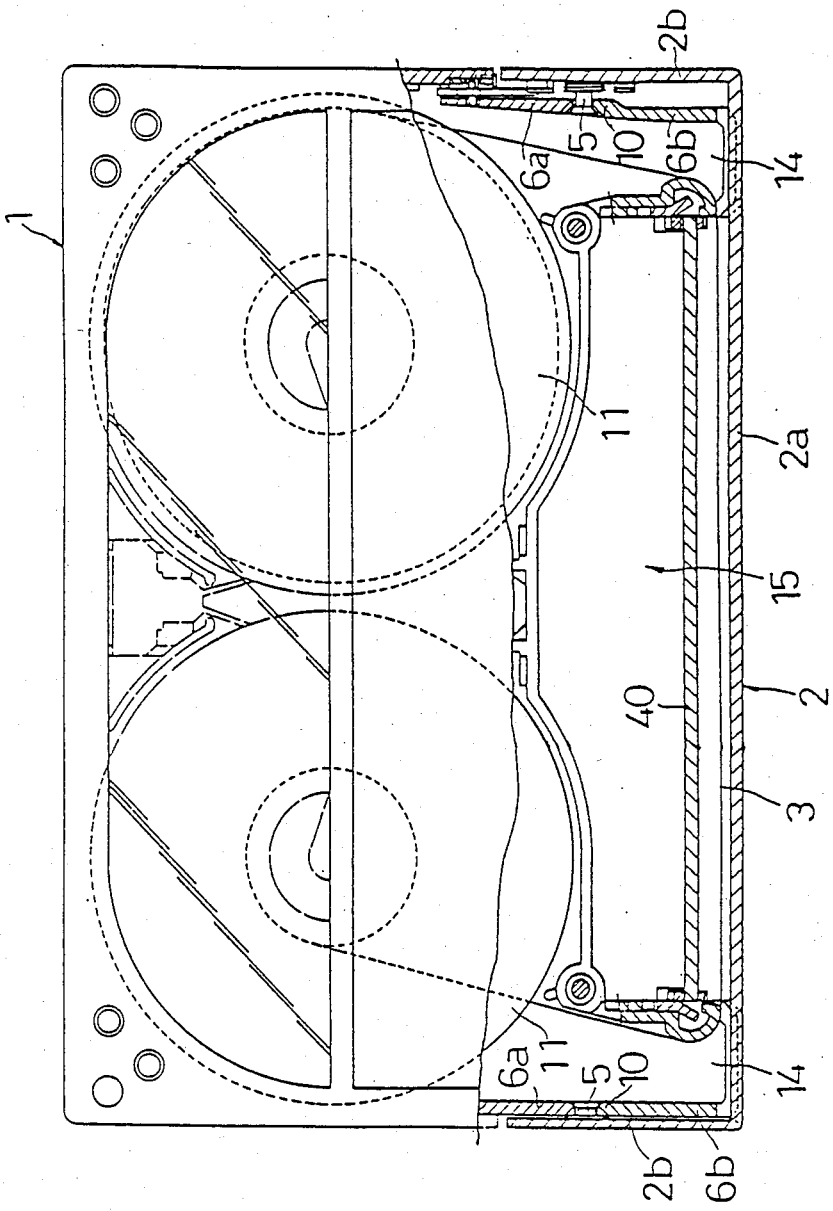
FIG. 3 is a top plan view of the recording tape cartridge shown in FIG. 2 with a part broken.

Referring to FIGS. 2 and 3, there is shown a small sized video tape cartridge in which a case body 1 is formed by assembling a top section 1a and a bottom section 1b each made of plastic resin material. In the case body 1, a pair of tape reels 11 on which a recording tape is wound are accommodated. Each of the tape reels 11 is rotatably supported on the drive insertion holes 13 defined on the bottom wall 12 of the bottom section 1b. On the both left and right side end portions of the front portion of the case body 1, tape drawing openings 14 are formed so that the recording tape 3 released from one of the reels is drawn toward the exterior of the case body 1 through one of the tape drawing openings 14 and is taken up on the other tape reel passing through the other tape drawing opening 14. A pocket 15 in the form of a recess is formed between both tape drawing openings 14 in the front central portion of the case body 1 for receiving a tape drawing pin (not shown) of a video tape recorder.

A lid member 2 is provided for closing and opening the front portion of the case body 1 to protect the recording tape 3. The lid member 2 is formed by a generally flat lid plate 2a for closing the front portion of the case body 1, a pair of supporting arms 2b projected from the lid plate 2a rearwardly at both left and right ends of the lid plate 2a and supporting shafts 5 projected inwardly from the respective inner faces of the supporting arms 2b. The lid member 2 is formed by a plastic resin molding. The lid member 2 is rotatably mounted on the case body 1 in such a manner that the case body 1 is fitted in the space between the supporting arms 2b with the inner surfaces of the supporting arms 2b opposed to the outer surfaces of the both side walls of the case body 1 and the supporting shafts 5 are respectively engaged in the supporting recesses 4 (see FIG. 10) defined on both side walls 6a of the case body 1 so as to support the lid member 2 rotatably between the opened position and the closed position around.

Figure 10:
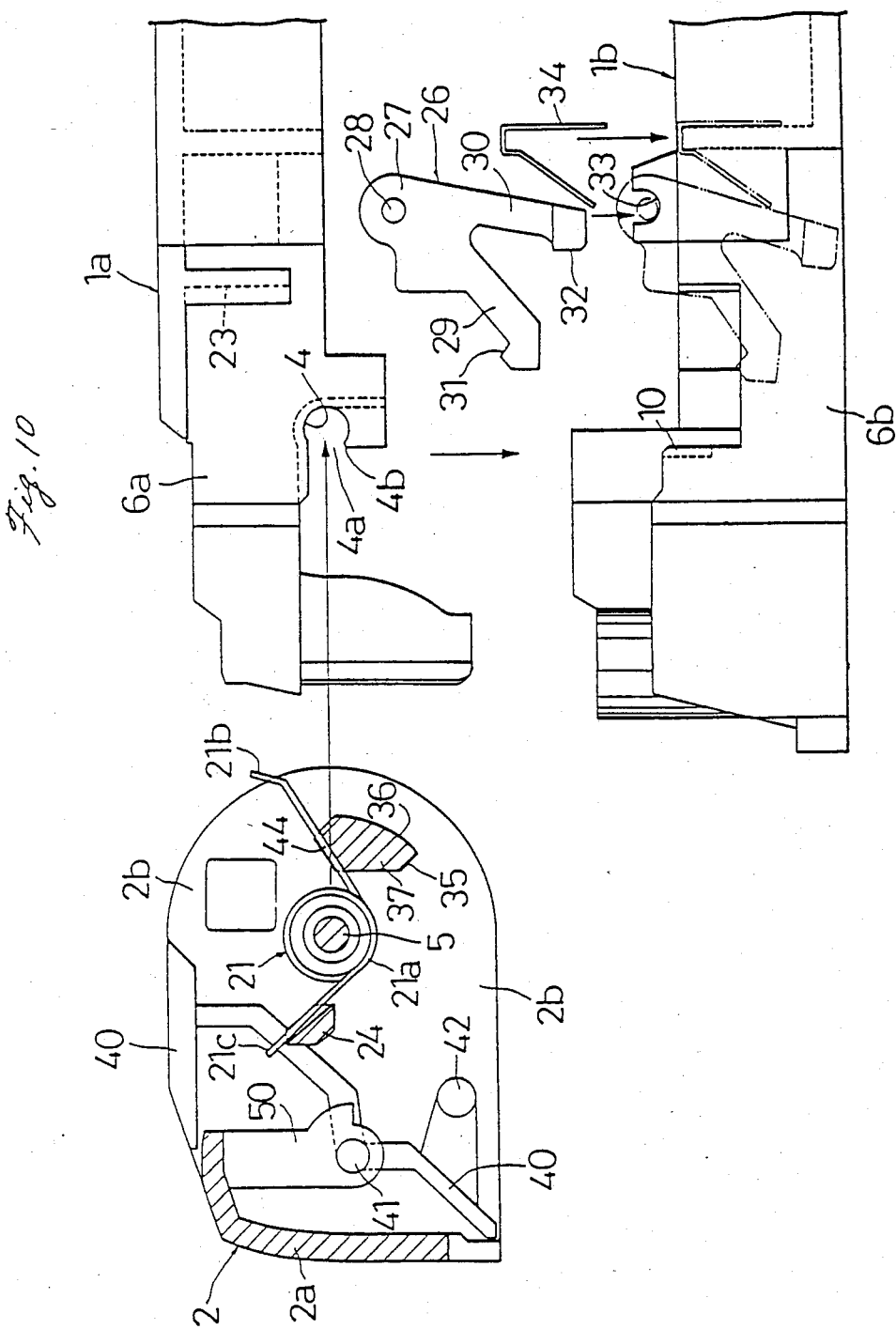
FIG. 10 is a side view showing one example of a way of assembling the lid member, top section and the bottom section.

In FIG. 10, each of the supporting recesses 4 is formed in a generally C configuration with an opening 4a defined in the front portion of the recess 4 so as to allow to pass the supporting shafts 5 of the lid member 2 moved in a rearward direction from the front when the lid member 2 is mounted on the case body 1. A small chip 4b is projected upwardly from the front lower portion of the opening 4a so as to prevent the supporting shafts 5 from being undesirably disengaged from the supporting recess 4 by an undesired external force such as vibration after once the supporting shafts 5 have been fully fitted in the supporting recess 4. The vertical length of the opening 4a is slightly smaller than the diameter of the supporting shaft 5. On the other hand, as shown in FIGS. 4 and 5, each of the supporting shafts 5 is provided with a bevelled flange portion 5a at the free end portion thereof with an expanded diameter larger than the diameter of the recess 4.

Referring to FIG. 4 through FIG. 8, closing wall members 10 are projectingly upwardly formed on portions of the side walls 6b of the bottom section 1b which are combined with the side walls 6a of the top section 1a so as to completely close the front portions of the respective openings 4a of the recesses 4 when the top section 1a and the bottom section 1b are assembled together.

The peripheral portion of each of the supporting recesses 4 and the closing wall 10 are countersunk as indicated by 5c (FIGS. 4 and 5) in a shape complementary to the bevelled flange 5a of the supporting shafts 5 so that the end face of the bevelled flange 5a is flush with or sunk from the inner surface of the side wall 6a upon engagement of the supporting shaft 5 in the recess 4 thereby preventing the end portions of the supporting shafts 5 from abutting on the recording tape 3.

The lid member 2 is movable between the closed position for closing the front face of the case body 1 and the opened position for opening the front face, and the lid member 2 is normally exerted toward the closed position by a coil spring 21 mounted on the right supporting projection 5. When the tape cartridge is not used, the lid member 2 is in the closed position so as to protect the front surface of the recording tape 3, on the other hand. when the tape cartridge is mounted on a video tape recorder, the lid member 23 is opened so that the recording tape 3 can be drawn out of the recording tape cartridge frontwardly by the tape loading pin entered from the pocket 15.

In FIG. 5, said coil spring 21 and a lid locking device for positioning the lid member 2 in the closed position are arranged in the space 22 between the right side wall 6a and the right arm 2b of the lid member 2. The coil spring 21 has its one end 21b engaged with the vertical slot 23 formed on the outer surface of the front portion of the right side wall 6 and its another end 21c engaged with the spring receiving member 24 formed on the right arm 2b of the lid member 2 with the intermediate portion 21a thereof engaged with the supporting shafts 5.

Figure 7:
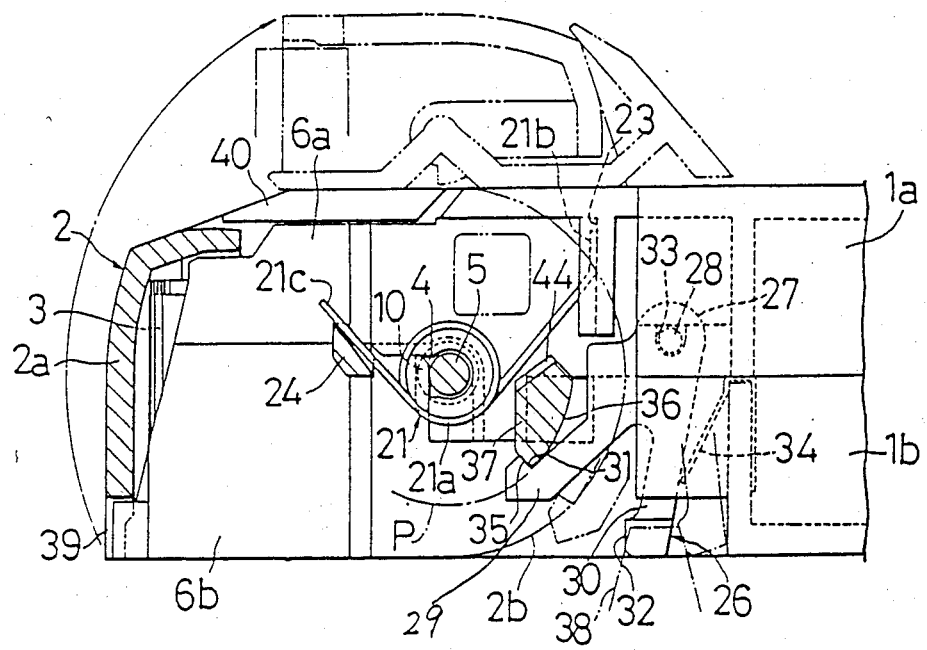
FIG. 7 is a cross sectional view taken along the line VII—VII in FIG. 5.
Figure 8:
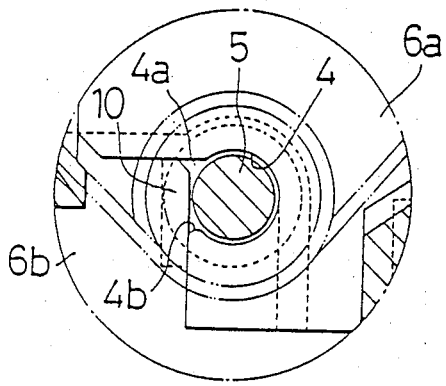
FIG. 8 is a cross sectional view showing an essential portion of FIG. 7.

FIG. 7 shows the lid locking device. A locking member 26 arranged in the space 22 comprises a head portion 27, a front leg 29 and a rear leg 30 both extending from the head portion 27 downwardly and two lateral shafts 28 projected toward both sides from the head portion 27. The lid locking member 26 is formed of plastic resin material by molding. An engaging surface 31 is formed on the lower part of the front leg 29. The front surface of the lower part of the rear leg 30 acts as a receiving member 32 for receiving a lock releasing member which will be mentioned later. The locking member 26 is suspended for swinging in frontward and backward directions by engaging the lateral shafts 28 in bearings 33 formed on the top end of the right side wall 6b of the bottom section 1b. The locking member 26 is normally exerted toward a frontward direction by means of a spring plate 34 disposed to the rear of the locking member 26.

As shown in FIG. 10, an engaging projection 37 is formed on the inner surface of the right arm 2b of the lid member 2 for engagement with the front locking member 26. Said engaging projection 37 has its front bottom portion formed with an engaging surface 35 and its rear bottom portion formed with an arcuated guide wall 36 with a slot 44 formed on the front top portion of the projection 37 for receiving the spring 21. The engaging projection 37 is disposed backward of the supporting shaft 5 of the lid member 2 so that when the locking member 26 is exerted in a frontward direction, the engaging surface 31 of the front leg 29 can engage with the engaging surface 35 of the engaging projection 37 from below when the lid member 2 is placed in the closed position. By this arrangement, when the tape cartridge is not used, said engaging surface 31 exerted frontwardly by the spring plate 34 is resiliently engaged with the engaging surface 35 of the lid member 2 situated in the closed position. Since the engaging surface 31 of the locking member 26 is engaged with the engaging surface 35 under such a state that the engaging surface 31 of the locking member 26 is perpendicular to the moving locus P of the engaging surface 35 when the lid is opening, it can be surely prevented that the lid member 2 is rotated toward the opened position around the supporting shafts 5 when not in use. Upon mounting the tape cartridge on the video tape recorder, as shown in the chain line, the lock releasing pin 36 is entered relative to and guided from the front in the space 22 through the cut portion 39 formed on the lower end portion of the front plate 2a of the lid member 2, whereby the lock releasing pin 36 pushes the receiving surface of the rear leg 30 of the locking member 26. Thus, the locking member 26 is rotated backwardly against the force of the spring plate 34 and the engaging surface 31 of the locking member 26 is moved downwardly away from the moving locus P, then the lid member 2 is released from the locking state. Subsequently, a fixed lever (not shown) is abutted onto the cut portion 39 of the lid member 2 so as to move the lid member 2 to the opened position. When the operation in the video tape recorder is finished, the lock releasing member 38 and the fixed lever return to the original position, whereby the locking member 26 is moved frontwardly by the force of the spring plate 34 and the engaging surface 31 is engaged with the arcuated guide surface 36 of the lid member 2 which is moving toward the closed position. When the lid member reaches the closed position, the engaging surface 31 can engage with the engaging surface 35 of the engaging projection 37 so as to lock the lid member 2 in the closed position.

Figure 11:
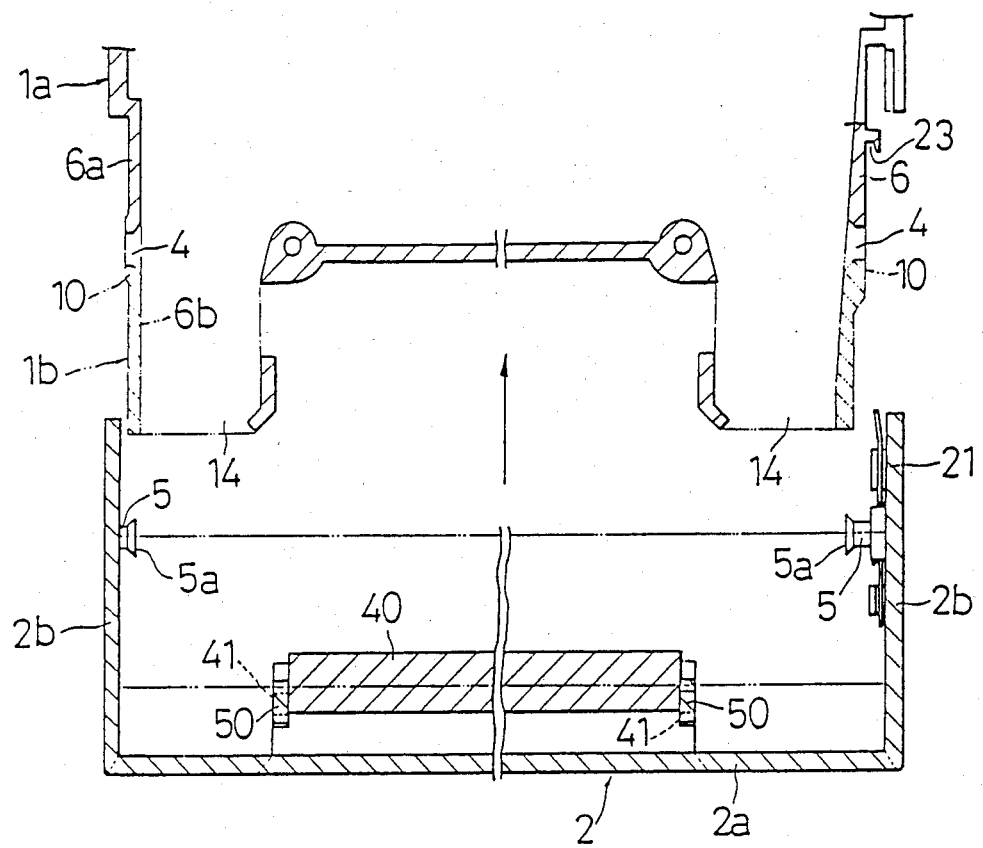
FIG. 11 is a top plan view showing the state of the lid member before the lid member is mounted on the top section.

As shown in FIGS. 3 and 11, a dust cover 40 is rotatably mounted in a space between the cover supporting members 50 with the supporting shafts 41 engaged in the cover supporting member 50. The dust cover 50 covers the inside of the recording tape including the lower portion of the recording tape and the upper opening of the pocket 15 so as to prevent the recording tape from being stained by dust. The dust cover 40 comprises cam pins 42 which are engaged in the corresponding cam slots 43 formed on the side surfaces of the pocket 15, so that the dust cover 40 can be moved upwardly along the cam slots 43 with the lid member 2 without interference with the recording tape 3 when the lid member 2 is opened.

When assembling the lid member 2, top section 1a and the bottom section 1b, the dust cover 40 is attached to the lid member 2 then the coil spring 21 is preliminarily attached to the lid member 2, subsequently, the lid member 2 is attached to the top section 1a, then at last, the top section 1a is assembled to the bottom section in which the tape reels 11 and other components are already accommodated therein.

Figure 9:
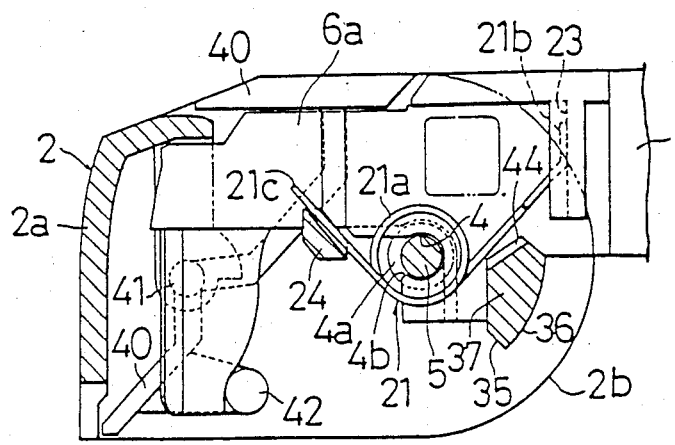
FIG. 9 is a cross sectional view showing the lid member preliminarily engaged on the case body.

More specifically, the supporting shafts 41 of the dust cover 40 are rotatably engaged in the dust cover supporting members 50, then the intermediate portion 21a of the coil spring 21 is fitted onto the supporting shafts 5 of the right supporting arm 2b the lid member 2, having the one end 21b of the coil spring 21 engaged in the slot 44 formed on the top end of the supporting projection 37 and another end 21c engaged with the receiving portion 24. Namely, the coil spring 21 is preliminarily attached to the lid member 2. Subsequently, by inserting the lid member 2 to the top section 1a the front, as shown in FIG. 9, the one end 21b of the coil spring 21 can be put in the slot 23 in the top section 1a. Further movement of the lid member in the backward direction causes the one end 21b of the coil spring 21 to disengage from the slot 44 of the supporting projection 37 and causes the supporting shafts 5 to enter in the recesses 4 passing snappingly through the chips 4b which are deformed elastically but recovers the original shape after passage of the shafts 5, whereby the lid member 2 can be preliminarily mounted on the top section 1a and the coil spring 21 acts to bias the lid member 2 to the closed position. The locking member 26 is suspended on the bottom section by dropping the lateral shafts 28 in the bearings 33 on the bottom section 1b movably engaging therein, and the spring plate 34 is placed to the rear of the locking member 26. Then the top section 1a and the bottom section 1b are assembled together and the closing members 10 close the respective recesses 4 to prevent disengagement of the supporting shafts 5 of the lid member 2 from the recesses 4.

According to the embodiment of the present invention as described above, one advantage is in that the lid member 2 can be mounted on the top section directly moving from the front without deforming the supporting arms 2b outwardly and the spring 21 also can be assembled in position automatically.

It is noted that the order of assembling of the coil spring and the shape thereof may be changed as desired.

Figure 12:
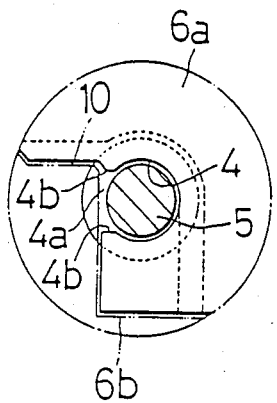
FIG. 12 is a cross sectional view showing another embodiment of the recording tape cartridge according to the present invention.
Figure 13:
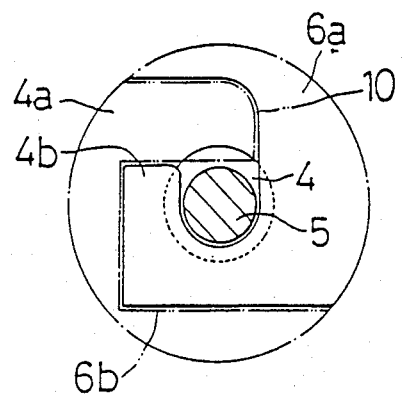
FIG. 13 is a cross sectional view of a further embodiment of the recording tape cartridge according to the present invention.
Figure 14:
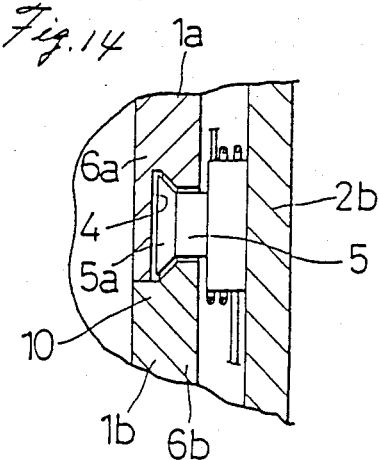
FIG. 14 is a cross sectional view showing the detail of a supporting shaft of the lid member used in the various embodiments.
Figure 15:
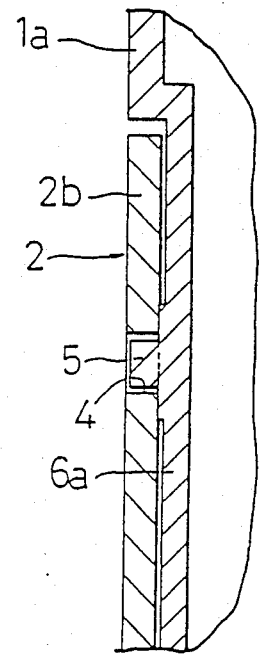
FIG. 15 is a cross sectional view showing one example of the recording tape cartridge in which the lid assembling mechanism according to the present invention is used on one side of the cartridge and a modification thereof is used on the other side.

Furthermore, as shown in FIG. 12, the projections 4b for preventing disengagement of the supporting shafts 5 of the lid member 2 can be formed on the lower portion and the upper portion or only on the upper portion of the opening 4a. Furthermore. as shown in FIG. 13, the supporting recesses 4b may be formed in a reversed L character configuration. In this case, the opening 4a may be slightly larger than the diameter of the supporting shaft 5 of the lid member 2. Furthermore, in place of making the recess 4 by a through hole, it can be formed in the form of a blind recess formed on the outer surface of the side wall 6a. Furthermore, said recess 4 as mentioned above can be formed only on one side wall of the case body with the other recess formed similar to the conventional manner in which one supporting shaft is inserted in the recess 4 from outside. Furthermore, as shown in FIG. 15, the supporting arrangement according to the present invention is used for one side and the other side may be formed in such a manner that one supporting shaft 5 is formed on the side wall of the top section 1a to engage in a hole 4 formed on the arm 2b. In this case, the supporting recess 4 may be a blind recess in place of the through hole configuration depending on the thickness of the supporting shaft.

According to the present invention, since the lid member is surely held on the top section by merely fitting the lid member onto the top section from the front without any deformation of the lid member, it is facilitated for the lid member to be mounted on the top section in an automatic production basis.

What is claimed is:

1. A recording tape cartridge comprising:
   a case body formed by a top section and a bottom section of generally rectangular configuration with a peripheral wall extending between said top and bottom sections along sides thereof and providing an open front portion;
   a lid member having a front lid plate and a pair of side arms projecting inwardly from said lid plate, said lid member being movable between a closed position for closing the front portion of the case body and an opened position;
   a supporting shaft mounted on an inner surface of at least one of said side arms;
   a shaped supporting recess means defined in the peripheral wall opposing to said supporting shaft for movably supporting said supporting shaft, said supporting recess means being formed from a partial recess in the top section which is juxtaposed adjacent to a partial recess in the bottom section to permit the supporting shaft to enter therebetween from the front when said case is assembled;
   a bevelled flange affixed to said supporting shaft and substantially disposed within a counterbore in an inner face of the peripheral wall of the case body for preventing disengagement of the supporting shaft from the supporting recess means.

2. A recording tape cartridge according to claim 1, and further including a lid lock for selectively locking said lid member in a closed position.

3. A recording tape cartridge according to claim 1, and further including spring means for biasing said lid member to a closed position.

4. The tape cartridge according to claim 1, wherein said shaped recess means consists of a C-shaped supporting recess.

5. The tape cartridge according to claim 1, wherein said shaped recess means consists of an L-shaped supporting recess.

6. The tape cartridge according to claim 1, wherein said shaped recess means consists of a U-shaped supporting recess.

7. A tape cartridge comprising:
   a case body formed by a top section and a bottom section with a side wall extending between said top and bottom sections along sides thereof and providing a front opening defined in a front portion of the case body;
   a lid member having an elongated lid plate and a pair of side arms projecting in a backward direction from both lateral end portions of the lid plate with at least one of the side arms being formed with a supporting shaft projected in an inward direction from an inner face of said one of the side arms so that the lid member is rotatably mounted on the case body for opening and closing the front opening by the lid plate with said one of the side arms to be rotatably engaged through said supporting shaft;
   a coil spring suspended between said side arm and the side wall of the case body for urging the lid member to a closed position;
   an enlarged flange formed at the inner end of the supporting shaft and substantially disposed within a counterbore in an inner face of the side wall of said case body, said supporting shaft being retained in a shaped recess means defined on a front side of said side wall of the top section with said shaped recess means receiving the supporting shaft; and
   said bottom section is provided with means for closing said opening of the recess means, so that when the top section and bottom section are assembled together, said closing means can close the opening of the recess means.

8. The tape cartridge according to claim 7, wherein said flange is bevelled and the outer diameter of the flange is larger than the diameter of the recess means and when said top section and bottom section are assembled together, the flange is opposed across the top section and bottom section and the area of the top section and bottom section contacting with the bevelled portion of the flange is recessed in said counterbore so that the bevelled portion of the flange can be retained in position in the counterbore.

9. The tape cartridge according to claim 7, wherein said shaped recess means consists of a C-shaped supporting recess.

10. The tape cartridge according to claim 7, wherein said shaped recess means consists of an L-shaped supporting recess.

11. The tape cartridge according to claim 7, wherein said shaped recess means consists of a U-shaped supporting recess.

* * * * *